(12) United States Patent
Shread et al.

(10) Patent No.: US 11,552,484 B2
(45) Date of Patent: Jan. 10, 2023

(54) SYSTEMS AND METHODS FOR OPERATING A SOLAR CHARGER SYSTEM FOR PROVIDING BATTERY AND CIRCUIT PROTECTION

(71) Applicant: Deltran Operations USA, Inc., Deland, FL (US)

(72) Inventors: Peter Shread, Deland, FL (US); Edward Brumley, Deland, FL (US)

(73) Assignee: Deltran Operations USA, Inc., Deland, FL (US)

( * ) Notice: Subject to any disclaimer, the term of this patent is extended or adjusted under 35 U.S.C. 154(b) by 161 days.

(21) Appl. No.: 17/084,277

(22) Filed: Oct. 29, 2020

(65) Prior Publication Data
US 2022/0140624 A1    May 5, 2022

(51) Int. Cl.
*H02J 7/04* (2006.01)
*H02J 7/00* (2006.01)

(52) U.S. Cl.
CPC ........ *H02J 7/0034* (2013.01); *H02J 7/00309* (2020.01)

(58) Field of Classification Search
CPC ..................................................... H02J 7/0034
USPC ......................................................... 320/165
See application file for complete search history.

(56) References Cited

U.S. PATENT DOCUMENTS

| | | | |
|---|---|---|---|
| 4,876,496 A * | 10/1989 | Duncan ................. | H02J 7/0034 320/164 |
| 6,130,813 A * | 10/2000 | Kates .................... | H02J 7/0031 361/93.1 |
| 6,184,660 B1 * | 2/2001 | Hatular .................. | H02J 7/022 320/141 |
| 9,007,015 B1 | 4/2015 | Nook et al. | |
| 2012/0299529 A1 * | 11/2012 | Guo ......................... | H02J 7/35 320/101 |
| 2013/0094115 A1 | 4/2013 | Lin et al. | |
| 2016/0219664 A1 | 7/2016 | Ellenberger | |
| 2017/0346140 A1 | 11/2017 | Koebler | |
| 2018/0034268 A1 | 2/2018 | Motsenbocker | |
| 2018/0034446 A1 * | 2/2018 | Wood ..................... | H02M 7/217 |
| 2018/0059498 A1 | 3/2018 | Coffin et al. | |

(Continued)

OTHER PUBLICATIONS

International Search Report dated Feb. 2, 2022 in PCT/US2021/56906.

(Continued)

*Primary Examiner* — Yalkew Fantu
(74) *Attorney, Agent, or Firm* — Fox Rothschild LLP; Carol E. Thorstad-Forsyth

(57) ABSTRACT

Systems/methods for operating a solar charger system. The system comprises: preventing, by a first circuit, damage to the solar charger system when a reverse polarity connection exists between a solar panel and the solar charger system; preventing, by a second circuit, damage to the solar charger system when a reverse polarity connection exists between the battery and the solar charger system; preventing, by a third circuit, damage to the battery when a temperature of a surrounding environment exceeds a pre-defined value while the battery is being charged by the solar charger system; and preventing, by a fourth circuit, back-feed from the battery without any voltage drop or loss while the battery is being charged by the solar charger system.

20 Claims, 10 Drawing Sheets

(56) References Cited

U.S. PATENT DOCUMENTS

2019/0044359 A1 2/2019 Gordon et al.
2020/0072177 A1 3/2020 Clarke et al.

OTHER PUBLICATIONS

Panguloori "Achieve Bidirectional Control and Protection Through Back-to-Back Connected eFuse Devices" Texas Instruments, Application Report—SLVA Dec. 2017.

* cited by examiner

Go to FIG. 10B

SYSTEMS AND METHODS FOR OPERATING A SOLAR CHARGER SYSTEM FOR PROVIDING BATTERY AND CIRCUIT PROTECTION

BACKGROUND

Statement of the Technical Field

The present disclosure relates generally to battery charging systems. More particularly, the present disclosure relates to implementing systems and methods for operating a solar controller battery charger and maintainer.

Description of the Related Art

Solar controller battery chargers are typically provided between a solar panel and a battery. The device is designed to re-charge the battery using harvested solar energy.

SUMMARY

The present disclosure concerns implementing systems and methods for operating a solar charger system. The methods comprising: preventing, by a first circuit, damage to the solar charger system when a reverse polarity connection exists between a solar panel and the solar charger system; preventing, by a second circuit, damage to the solar charger system when a reverse polarity connection exists between the battery and the solar charger system; preventing, by a third circuit (e.g., a resistance temperature detector), damage to the battery when a temperature of a surrounding environment exceeds a pre-defined value while the battery is being charged by the solar charger system; and preventing, by a fourth circuit, back-feed from the battery without any voltage drop or loss while the battery is being charged by the solar charger system.

In some scenarios, the first circuit comprises a diode connected between input terminals of the solar charger system. The second circuit comprises an opto-coupler. The opto-coupler comprises a diode connected between output terminals of the solar charger system, and a transistor having a source-drain path connected in series between a voltage source and ground. The diode allows a voltage signal to be supplied to a gate of the transistor when a reverse polarity connection exists on the battery, and/or prevents current from being transferred to the transistor when a proper connection is on the battery. Operations may be performed by a computing device to prevent enablement of a voltage output of the solar charger system when the reverse polarity connection exists between the battery and the solar charger system.

In those or other scenarios, the fourth circuit comprises a first field effect transistor connected in series with a second field effect transistor between an input terminal and an output terminal of the solar charger system. A drain of the first field effect transistor is connected directly to a drain of the second field effect transistor.

The present document also concerns a solar charger system. The solar charger system comprises: a first circuit configured to prevent damage to the solar charger system when a reverse polarity connection exists between a solar panel and the solar charger system; a second circuit configured to prevent damage to the solar charger system when a reverse polarity connection exists between the battery and the solar charger system; a third circuit configured to prevent damage to the battery when a temperature of a surrounding environment exceeds a pre-defined value while the battery is being charged by the solar charger system; a fourth circuit configured to prevent back-feed from the battery without any voltage drop or loss while the battery is being charged by the solar charger system; and/or a computing device configured to prevent enablement of a voltage output of the solar charger system when the reverse polarity connection exists between the battery and the solar charger system.

The first circuit may comprise a diode connected between input terminals of the solar charger system. The second circuit may comprise an opto-coupler. The opto-coupler may comprise a diode connected between output terminals of the solar charger system, and a transistor having a source-drain path connected in series between a voltage source and ground. The diode may allow a voltage signal to be supplied to a gate of the transistor when a reverse polarity connection exists on the battery, and may prevent current from being transferred to the transistor when a proper connection is on the battery.

The third circuit may comprise a resistance temperature detector. The fourth circuit may comprise a first field effect transistor connected in series with a second field effect transistor between an input terminal and an output terminal of the solar charger system. A drain of the first field effect transistor is connected directly to a drain of the second field effect transistor.

BRIEF DESCRIPTION OF THE DRAWINGS

The present solution will be described with reference to the following drawing figures, in which like numerals represent like items throughout the figures.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

Figure 1:
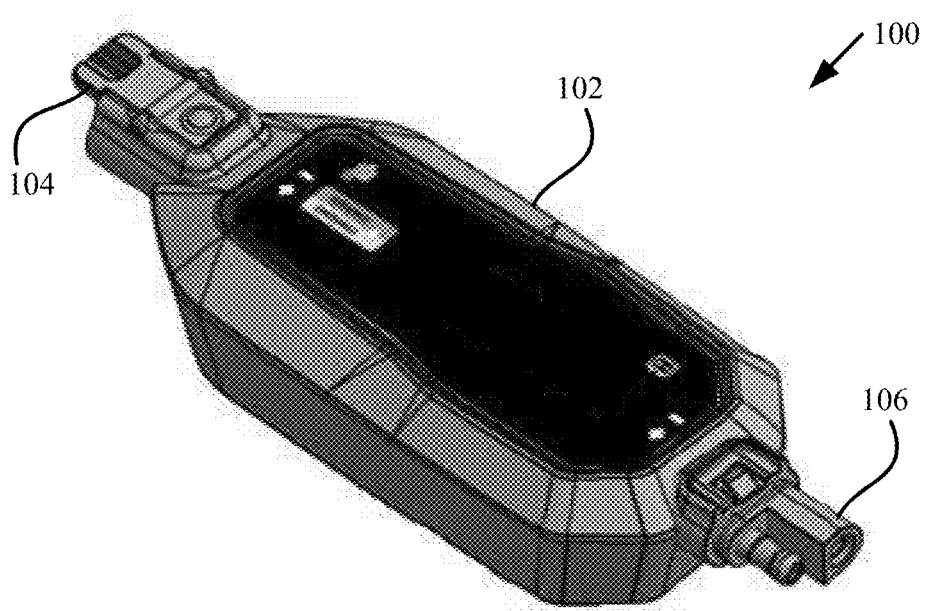
FIG. 1 provides a perspective view of an illustrative solar charger system.
Figure 2:
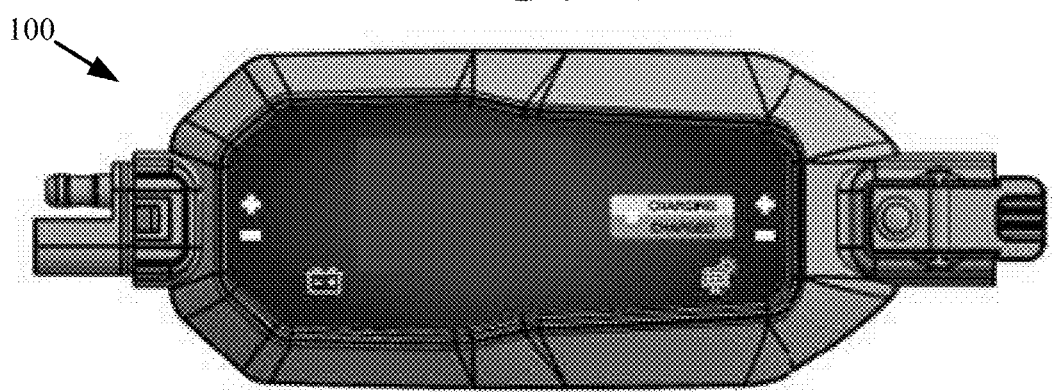
FIG. 2 provides a top view of the solar charger system shown in FIG. 1.
Figure 3:
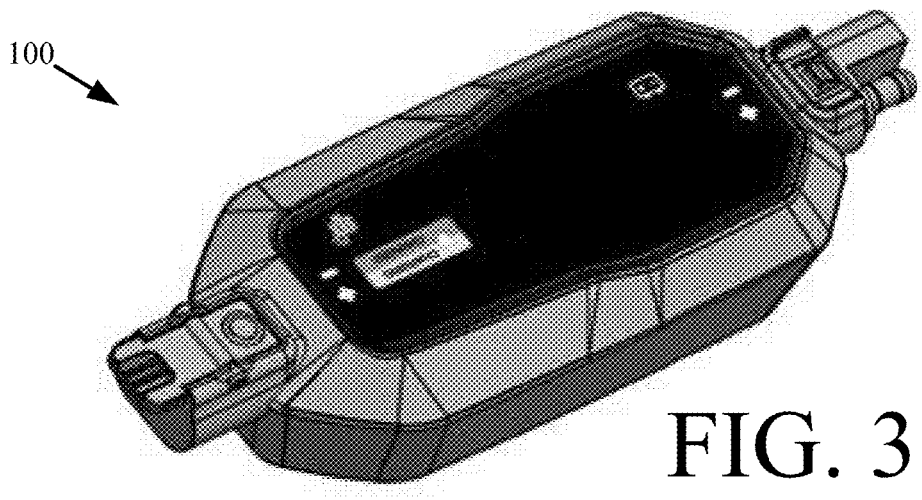
FIG. 3 provides a perspective view of the solar charger system shown in FIG. 1 from a different perspective.

Referring now to FIGS. 1-3, illustrations are provided for a solar charger system 100. The solar charger system 100 is generally configured to re-charge a battery using solar energy harvested by one or more solar panels. In this regard, the solar charger system 100 comprises a circuit (not visible in FIGS. 1-3) disposed in a housing 102. The housing 102 is designed to protect the circuit from contaminants in the surrounding environment, as well as from damage due to forces being applied to the solar charger system 100 (e.g., when the solar charger system is dropped or otherwise impacts an external object). The housing is also designed to maintain the circuit in a given position relative to a first electromechanical connector 104 and a second electromechanical connector 105. The electromechanical connector 104 and a second electromechanical connector 105 may include, but are not limited to, quick connect/disconnect couplers that facilitate fast and easy (i) connection of the solar charger system 100 to external devices (i.e., solar panel(s) and battery) and (ii) disconnection of the solar charger system 100 from the external devices. Quick connect/disconnect couplers are well known.

Figure 4:
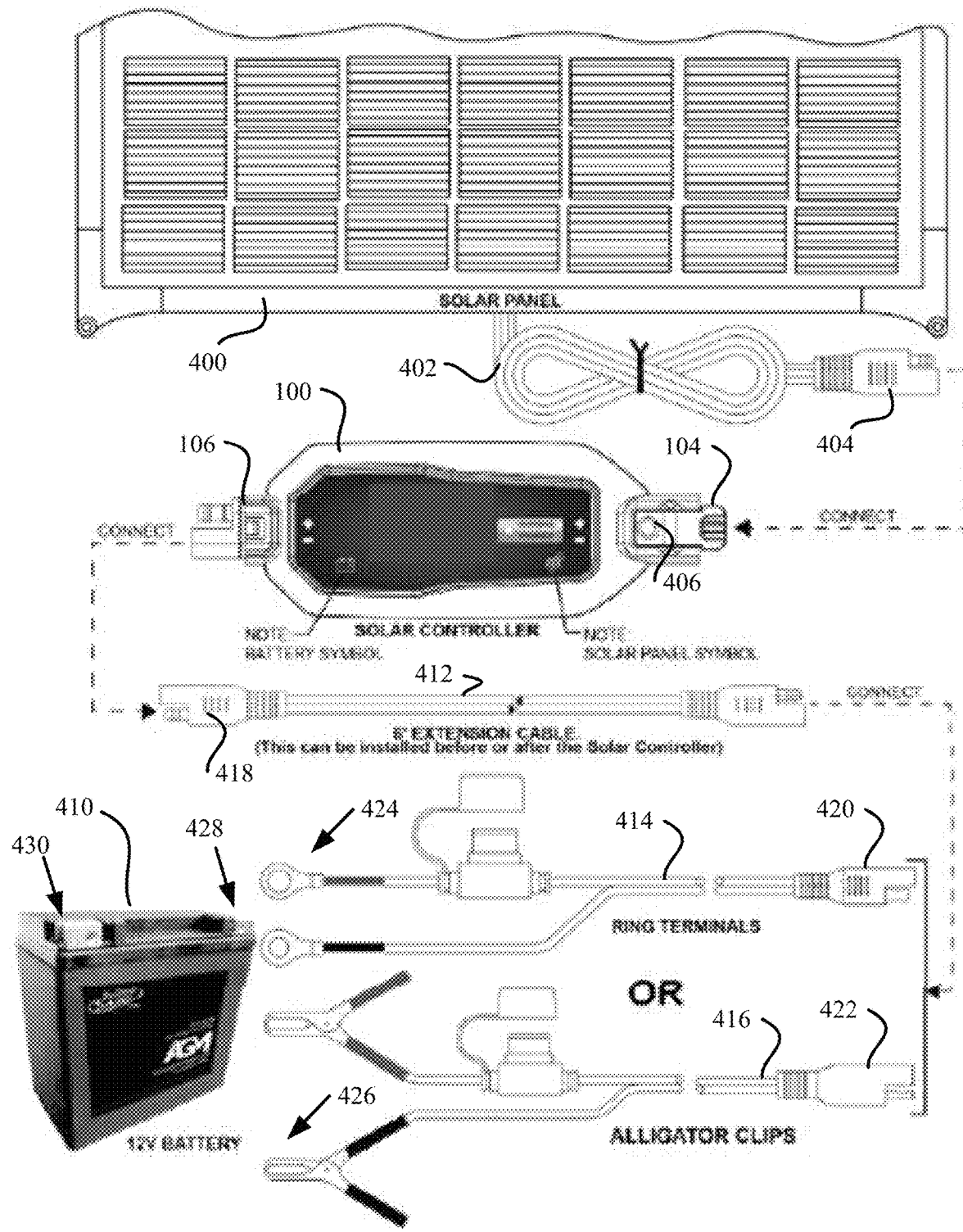
FIG. 4 provides an illustration that is useful for understanding how the solar charger system of FIGS. 1-3 is coupled to a solar panel and a battery.

As shown in FIG. 4, the first electromechanical connector 104 is configured to (i) mechanically connect the solar charger system 100 to solar panel(s) 400 via a cable 402 and (ii) electrically connect the internal circuit of the solar charger system 100 to the solar panel(s) 400 via the cable 402. Solar panels are well known. Any known or to be known solar panel can be used with the solar charger system 100. For example, in some scenarios, the solar panel 400 comprises a 12 Volt nominal voltage solar panel. The first connector 104 may comprise a connector that at least partially plugs into a connector 404 provided on a free end of the cable 402. An electromechanical connection is provided between devices 100, 400 when the connector 104 is plugged into the connector 404 of the solar panel. A depressible button 406 may be provided to facilitate a selective decoupling of the two connectors 104, 404 from each other. Connectors 104, 404 of the types shown in FIGS. 1-4 are well known in the art.

The second connector 106 is configured to (i) mechanically connect the solar charger system 100 to a battery 410 via cable(s) 412, 414, 416 and (ii) electrically connect the internal circuit of the solar charger system 100 to the battery 410 via the cable(s) 412, 414, 416. The battery 410 can include, but is not limited to, a lead acid battery, an AGM battery, a gel battery, a LiFEPO4 battery, and/or other chemistry type of battery. In some scenarios, the battery 410 comprises a 12 Volt nominal voltage battery of any chemistry type. The second connector 106 may comprise a connector that at least partially plugs into a connector 418 provided at a free end of cable 412, a connector 420 provided at a free end of cable 414 and/or a connector 422 provided at a free end cable 416. An electromechanical connection is provided between devices 100, 410 when (a) the second connector 106 is plugged into connector 218, 220 or 222 and (b) electrical contacts 424, 426 are connected to electrical contact 428, 430 of the battery 410.

According to one aspect, the connectors 104, 106, 404, and 418-422 can each be comprised of a positive polarity conductor and a negative polarity conductor. In the case of connectors 104, 404, the positive polarity conductors facilitate an electrical connection between the positive polarity output terminal of the solar panel and the positive polarity input of the solar controller. The negative polarity conductors facilitate an electrical connection between the negative polarity output terminal of the solar panel and the negative polarity input of the solar controller. In connectors 106, 418, 420, 422, the positive polarity conductors facilitate a connection between the positive polarity output terminal of the solar controller and the positive polarity post of the battery 410. The negative polarity conductors facilitate a connection between the negative polarity output terminal of the solar controller and the negative polarity post of the battery 410.

Connectors 106, 418-422 are mechanically and electrically configured to allow connection to a corresponding mating connector as described herein. Further, each connector is arranged such that the positive polarity conductor of a connector cannot inadvertently be connected to the negative polarity conductor of a connector to which it is mated. Connectors of this type are sometimes referred to herein as polarized connectors and are incorporated into the system for safety reasons. The connector arrangement generally is sometimes referred to herein as a polarized connection system.

Field setup of solar panels can sometimes be performed under difficult conditions and/or may sometimes involve users who lack much technical knowledge. Accordingly, the polarized connectors described herein can ensure that connection polarity cannot be inadvertently reversed by a user. Various suitable electro-mechanical configurations for polarized connectors 106, 418-422 are known in the art and therefore will not be described here in detail. Any type of polarized connector can be used for this purpose, whether now known or known in the future.

Figure 5:
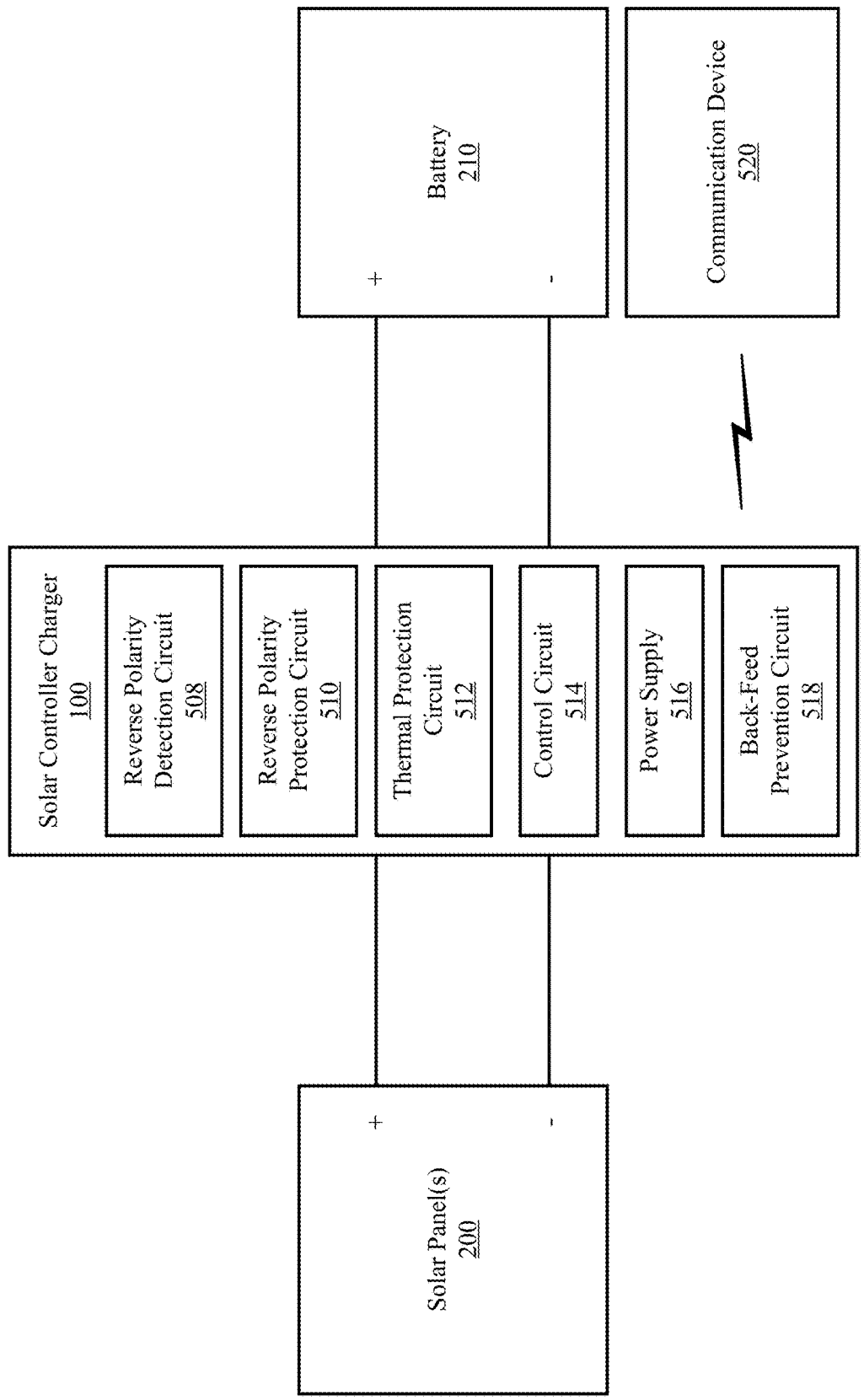
FIG. 5 provides a block diagram showing the solar charger system coupled to the solar panel and battery.

Referring now to FIG. 5, there is provided a block diagram for the solar charger system 100. The solar charger system 100 has many advantages, particularly when combined with the polarized connection system described herein. For example, the solar charger system 100 is configured to charge a battery 410 without human intervention, provide reverse polarity protection such that an internal circuit cannot be damaged when a reverse polarity connection on an input device 400 or an output device 410, provide protection from battery damage due to overcharging, and provide protection from battery damage due to high temperatures of a surrounding environment while the battery 410 is being charged by the solar charger system 100.

As shown in FIG. 5, the solar charger system 100 comprises a reverse polarity detection circuit 508, a reverse polarity protection circuit 510, a thermal protection circuit 512, a back-feed prevention circuit 518, a control circuit 514, and a power supply 516. The back-feed prevention circuit 518 is generally configured to prevent back-feed from the battery 410 without voltage drop or loss during charging of the battery 410. The particulars of the back-feed prevention circuit 518 will be described in detail below.

The control circuit 514 is generally configured to control operations of the solar charger system 100. For example, the control circuit 514 can include a processor or other computing device implementing a universal battery charging algorithm that facilitates charging of the battery 410 via solar panel 400 without any user intervention. In some scenarios, the control circuit 514 can be a programmable microcontroller. The particulars of the control circuit 514 and the universal battery charging algorithm will be described in detail below.

Two different features are included in the system described herein to provide reverse polarity protection in the connection between the solar controller charger 100 and the solar panel 400. A first protection feature is the polarized connection system described herein. A second protection feature is integrated into the circuitry of the solar controller. In particular, a reverse polarity protection circuit 510 is configured to protect the solar controller charger 100 from circuit damage when a reverse polarity connection is made between the solar panel 400 and the solar controller charger 100.

As explained below in further detail, the solar panel 400 is used to provide primary power to a power supply 516 of the solar controller charger 100. In some scenarios, the power supply 516 can include a voltage regulator circuit which provides regulated power to the various circuits comprising the solar controller charger 100. The reverse polarity protection circuit 510 is configured so that if a reverse polarity connection is made between the solar panel 400 and the solar controller charger 100, then the power supply 516 will not provide an output voltage. As such, the solar controller charger 100 does not turn on in this case, and is protected from damage caused by reverse polarity on the solar panel 400. The polarity protection circuit 510 is described below in greater detail.

The reverse polarity detection circuit 508 is generally configured to detect a reverse polarity connection between the solar controller charger 100 and the battery 410. If the solar panel 400 is connected with correct polarity such that the solar controller charger 100 is supplied power by the power supply 516, then the reverse polarity detection circuit 508 can detect a reverse polarity connection between the solar controller charger 100 and the battery 410. Detection of reverse polarity can trigger output of an alert or notification from the solar controller charger 100. The alert or notification can include an auditory alert/notification, a visual alert/notification, and/or a tactile alert/notification. In some scenarios, an electronic message is wirelessly sent from the solar controller charger 100 to one or more remote communication devices 520 (e.g., a mobile phone, personal computer, or laptop) for alerting or notifying individual(s) of the reverse polarity detection. This wireless communication can be achieved in accordance with any known or to be known wireless communication technology (e.g., WiFi, cellular, Internet, etc.). The electronic message can include, but is not limited to, a text message and/or an electronic mail message. The reverse polarity detection circuit 508 is described below in greater detail.

The thermal protection circuit 512 is generally configured to prevent damage to the battery 410 in high temperature environments. As such, the thermal protection circuit 512 comprises a temperature detector that detects a temperature of a surrounding environment and changes in the same. Temperature detectors are well known in the art. Any known or to be known temperature detector can be used here. In some scenarios, a thermistor or a Negative Temperature Coefficient (NTC) temperature sensor is employed. The NTC temperature sensor comprises a voltage divider and a resistor with a resistance that changes as a function of temperature. When the detected temperature reaches a threshold value (e.g., 50° C.), the solar controller charger 100 is automatically turned off by the control circuit 514 so that the battery 410 is not damaged while being charged in relatively high temperatures.

Figure 6:
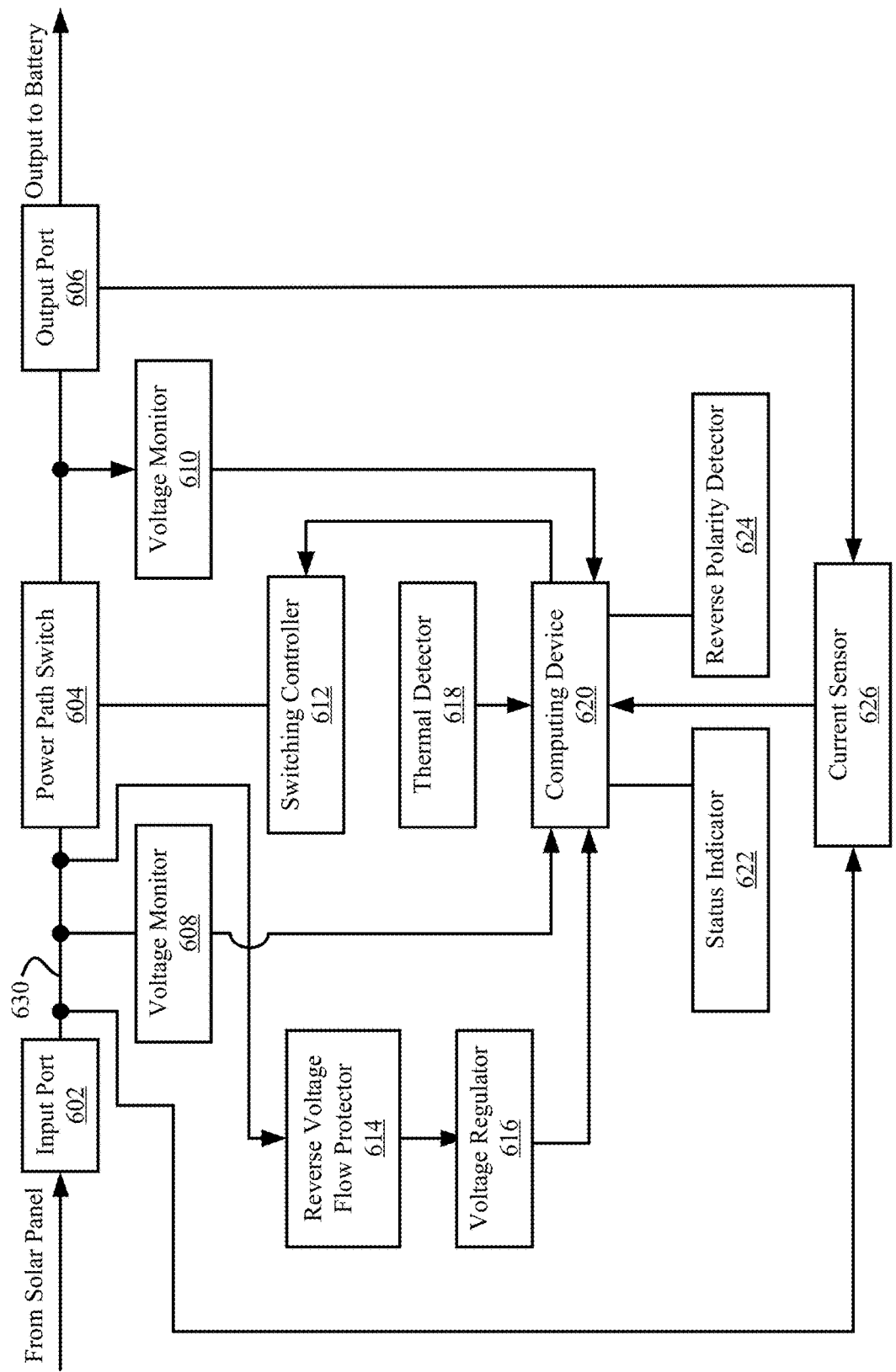
FIG. 6 provides an illustration of an illustrative circuit for the solar charger system.

Referring now to FIG. 6, there is provided a more detailed block diagram of the internal components of the solar charger system 100. The control circuit 514 includes a plurality of circuit components 602-626 connected between an input port 602 and an output port 505. These circuit components can include, but are not limited to, a computing device 620 and a switching controller 612. The computing device 620 can include, but is not limited to, a processor and/or the computing device shown in FIG. 9 (which will be discussed below).

As noted above in relation to FIG. 5, the control circuit 514 receives information from the reverse polarity detection circuit 508, the reverse polarity protection circuit 510, the thermal protection circuit 512, and the back-feed prevention circuit 518. As shown in FIG. 6, the control circuit 514 also receives information from voltage monitors 608, 610 and a current sensor 626. Voltage monitors and current sensors are well known in the art. Any known or to be known voltage monitor or current sensor can be used here.

The reverse polarity detection circuit 508 comprises a reverse polarity detector 624 (e.g., an opto-coupler). The reverse polarity protection circuit 510 comprises a power path switch 604 on the battery side and a reverse current flow protector 614 on the panel side. The power path switch 604 will be described in detail below. The thermal protection circuit 512 comprises a thermal detector 618. Thermal detectors are well known. Any known or to be known thermal detector can be used. The back-feed prevention circuit 518 comprises the power path switch 604. A more detailed circuit diagram for the solar charger system 100 is provided in FIG. 7. Thus, the particulars of each circuit component 624, 604, 618, 614 will become more evident as the discussion progresses.

During operation, the information received from circuit components 608, 610, 614, 618, 624, 626 is processed by the computing device 620 and used to control operations of the power path switch 604 via the switching controller 612. The power path switch 604 is controlled to (A) allow and/or prevent energy from the solar panel 400 (coupled to the an input port 602) to be used to charge a battery 410 (coupled to the output port 606) without human intervention, (B) protect the solar controller from reverse polarity connections at the solar panel (C) provide protection for the computing device 620 (and other circuitry of the solar controller) from damage due to reverse polarity conditions on the battery, (D) provide protection to the battery from damage due to high temperature conditions in a surrounding environment, and/or (D) prevent back-feed from the battery without voltage drop or loss during charging.

For example, the computing device 620 causes closure of the power path switch 604 when: (i) a voltage is detected on an input line 630 by a voltage monitor 608 and/or a current is detected on the input line 630 by a current sensor 626 which indicate(s) that the solar panel is connected correctly to the solar charger system 100 and a sufficient amount of energy is being collected by the solar panel for charging the battery; (ii) no reverse polarity is detected on the battery by the reverse polarity detector 624; and (iii) a temperature of a surrounding environment detected by the thermal detector 618 is less than a threshold value (e.g., 50° C.). The computing device 620 causes opening of the power path switch 604 and/or prevent closure of the power path switch 604 when: (i) a voltage is detected on an input line 630 by a voltage monitor 608 and/or a current is detected on the input line 630 by a current sensor 626 which indicate(s) that the solar panel is not operating properly; (ii) a reverse polarity is detected on the battery by the reverse polarity detector 624; and/or (iii) a temperature of a surrounding environment detected by the thermal detector 618 is equal to or greater than the threshold value (e.g., 50° C.). Other operations of the computing device 620 will become evident as the discussion progresses.

Figure 7:
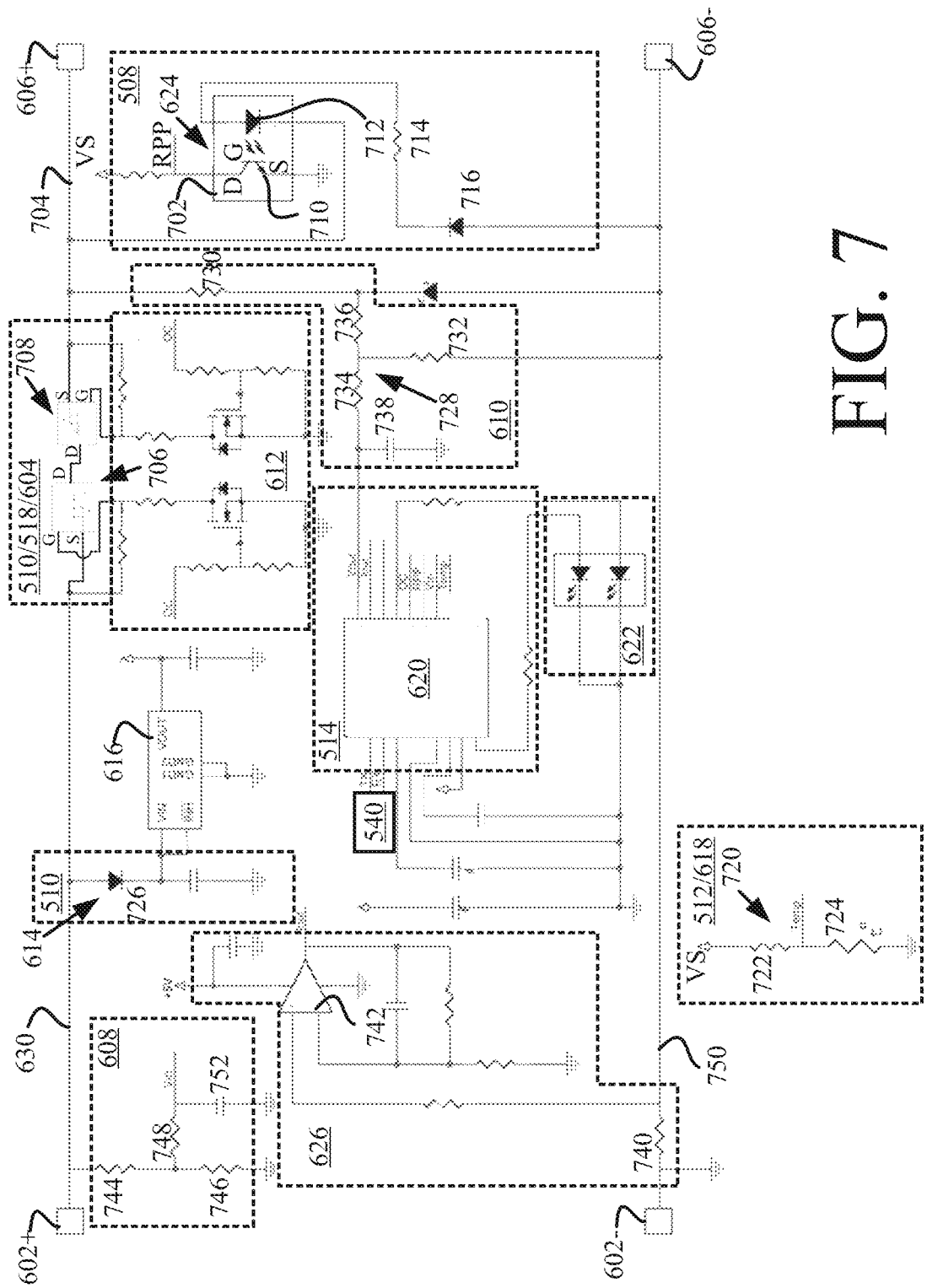
FIG. 7 provides a more detailed circuit diagram for the solar charger system.

Referring now to FIG. 7, there is provided a more detailed circuit diagram for the solar charger system 100. When powered up and initialized, the computing device 620 of the solar charger system 100 detects a voltage on the battery terminals 606+, 606− via connection line Vout. A voltage divider 728 is provided to facilitate detection of a voltage at battery terminals 606+, 606−. Voltage dividers are well known. The voltage divider 728 comprises resistors 730, 732, 734, 736 and a capacitor 738. Resistors 730, 736, 732 are connected in series across the battery output lines 606+, 606−. Resistor 734 is connected to between resistor 736 and a terminal of the computing device 620. Capacitor 738 is connected between resistor 734 and ground. However, those having ordinary skill in the art will appreciate that numerous different types of voltage divider circuits are possible and can be used for the purposes as hereinafter described. When this voltage exceeds a threshold value (e.g., +2V), the computing device 620 causes switch(es) 706, 708 of the power path switch 604 to be closed. However, the power path switch 604 is not closed when a reverse polarity condition exists on the battery side. As noted above, this reverse polarity condition is detected by the reverse polarity detector 624. Each switch 706, 708 can include, but is not limited to, transistor(s).

The reverse polarity detector 624 of the reverse polarity detection circuit 508 is implemented using an opto-coupler 702. The opto-coupler 702 comprises two isolated circuit components, namely a diode 712 and a transistor 710. The diode 712 is connected between terminals 606+, 606− of the output port 606. The transistor 710 has three terminals S, G, D respectively defined as a source, a gate and a drain. An electrical path can be provided from the source S to the drain D of the transistor 710. This path is generally referred to herein as the source-drain path. The source-drain path of the transistor 710 is connected in series between a voltage source VS (e.g., a 5V source) and ground. A gate drive circuit is provided by the diode 712 of the opto-coupler 702, a resistor and another diode 716. The gate drive circuit is generally configured to cause a voltage signal to be supplied to the gate G of the transistor 710 at certain times for switching the transistor to its on-state/conducting-state or off-state/nonconducting-state. For example, a voltage signal is supplied to the gate G of the transistor 710 when a reverse polarity connection exists on the battery. Each gate drive circuit is also configured to stop causing the voltage signal from being supplied to the gate G of the at certain times for switching the transistor 710 to its on-state/conducting-state or its off-state/nonconducting-state. For example, the voltage signal is not supplied to the gate G of the transistor 710 when a reverse polarity connection does not exist on the battery.

The opto-coupler 702 operates by the amount of current flowing through terminals 606+, 606− of the output port 606. When a proper connection is on the battery, current is prevented by a diode 712 of the opto-coupler 702 from being transferred to a transistor 710 of the opto-coupler. In contrast, when a reverse connection is on the battery, a signal is transferred between the two isolated circuit components (i.e., the diode 712 and the transistor 710) of the opto-coupler by using light. This results in an electric signal being passed to the computing device 620 via connection line RPP. When the electrical signal is detected on connection line RPP by the computing device 620, the computing device determines that a reverse polarity condition exists on output line 704.

In response to an existence of a reverse polarity condition, the computing device 620 may take one or more actions to cause an individual to resolve or cure the reverse polarity condition and/or provide protection to the solar charger system 100 from the reverse polarity condition on the output line 704. The remedial measures can include, but are not limited to, controlling a status indicator 622 to output an alert or notification, and/or prevent communication of a command signal to the switching controller 612 via connection line OC so that the switch(es) 706, 708 of the power path switch 604 are not closed. Operations of the FET switches 706, 708 will be described in detail below. The status indicator 622 is implemented as Light Emitting Diodes (LEDs) for outputting a visual alert or notification. The present solution is not limited in this regard. The status indicator 622 can be implemented using any known or to be known output device (e.g., a display, a vibrator, a speaker, etc.) and/or wireless communication device 540 connected to the computing device 620 via a transmit connection line Tx and a receive connection line Rx.

The reverse polarity protection circuit 510 can comprise a diode 726 for protecting the solar controller charger 100 from damage due to reverse polarity on the solar panel side. The diode 726 is connected between the input terminals 602+, 602− (grounded) of the solar charger system. The diode 726 ensures that a voltage regulator 616 remains in an off-state when a reverse polarity connection exists on the solar panel. In this regard, it should be understood that the diode 726 provides the reverse current flow protector 614 to prevent current from flowing backwards, i.e., from terminal 602− to terminal 602+ when a reverse polarity condition exists on the solar panel side.

The thermal protection circuit 512 comprises the thermal detector 618. Thermal detector 618 is implemented in FIG. 6 as a Resistance Temperature Detector (RTD). The RTD comprises a voltage divider 720 with two resistors 722, 724 connected in series between the voltage source VS (e.g., 5V source) and ground. A resistance of resistor 724 changes when exposed to changes in temperature to. Changes in the resistance of resistor 724 causes changes of a voltage on a connection line Temp. Connection line Temp extends between the thermal detector 618 and the computing device 620. The computing device 620 uses the voltage on the connection line Temp to detect high temperature conditions in the surrounding environment. When such high temperature conditions are detected, the computing device 620 performs operations to cause on opening of the power path switch 604 so as to discontinue or prevent charging of the battery until the high temperature conditions no longer exist, and/or a user software interaction is received to manually override the charging discontinuation/prevention.

The solar charger system 100 also comprises circuit components to detect when the battery is fully charged. These circuit components include current sensor 626 and voltage monitors 608, 610. The state of charge of the battery is determined based on (i) an input voltage, (ii) an output voltage, and (iii) an output current. The switch(es) 706, 708 are controlled for starting battery charging, continuing battery charging, and/or discontinuing battery charging based on (i)-(iii). For example, the switch(es) 706, 708 are closed when the computing device 620 determines that the battery is not fully charged, and/or other conditions exist as discussed herein (e.g., a reverse polarity condition does not exist). In contrast, the switch(es) 706, 708 are opened when the computing device 620 determines that the battery is fully charged.

The current sensor 626 comprises a current sense resistor 740 and an operational amplifier 742 for measuring a voltage drop across the current sense resistor 740. Since the voltage drop is relatively small, the amplifier 742 is provided to amplify the same. The amplified voltage is provided to the computing device 620 via a connection line Tout. The computing device 620 determines an approximate input current in accordance with Ohms law. If the battery is coupled to the solar charger system 100 and the approximate input current is equal to or less than a threshold value (e.g., 50 mA), then the computing device 620 determines at least one indication has been made that the battery is fully charged.

Another indication that the battery is fully charged occurs (a) when voltage output from the voltage monitor 608 is at a given value (e.g., 14.5 Volts) or within a given value, and/or (b) when the voltage output from the voltage monitor 610 is at a given value (e.g., 14.1 Volts) or within a given value. The voltage monitor 608 comprises a voltage divider. Voltage dividers are well known. In FIG. 6, the voltage divider includes resistors 744, 746, 748 and a capacitor 752. The resistors and capacitors reduce an input voltage by a given percentage (10%-90%). The reduced voltage is output from the voltage monitor 608, and flows to the computing device 620 on connection line Vin. Those having ordinary skill in the art will appreciate that numerous different types of voltage dividers circuits are possible and can be used by voltage monitor 608 for the purposes as hereinafter described.

The voltage monitor 610 comprises the voltage divider. In FIG. 6, the voltage divider includes resistors 730, 732, 734, 736 and a capacitor 738. The resistors and capacitors reduce an input voltage by a given percentage (10%-90%). The reduced voltage is output from the voltage monitor 608, and flows to the computing device 620 on connection line Vout. Those having ordinary skill in the art will appreciate that numerous different types of voltage dividers circuits are possible and can be used by voltage monitor 610 for the purposes as hereinafter described.

Figure 8:
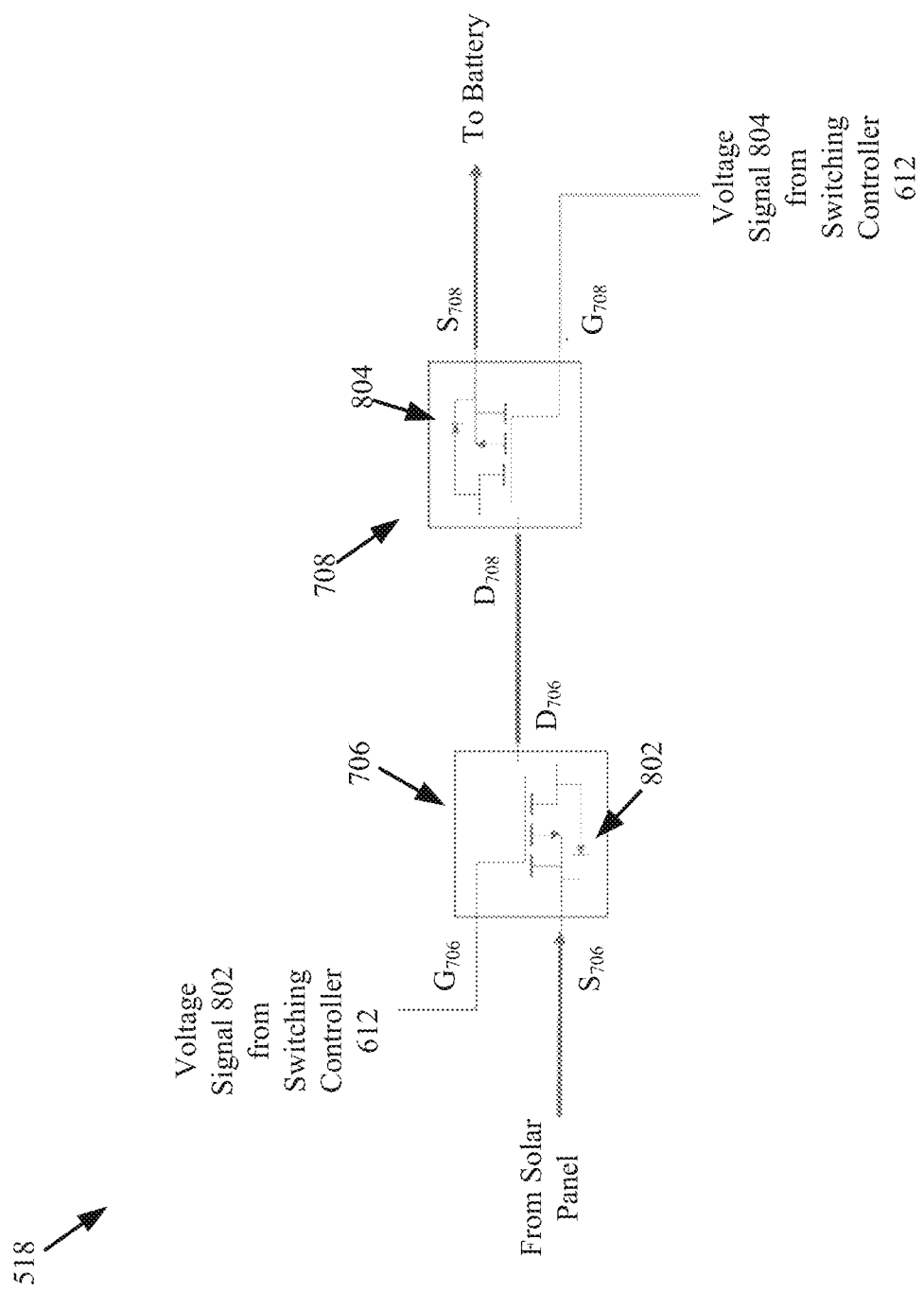
FIG. 8 provides an illustration that is useful for understanding operation of a power path switch.

Referring now to FIG. 8, there is provided an illustration that is useful for understanding operations of the back-feed protection circuit 518. As noted above, the back-feed protection circuit 518 is implemented via the power path switch 604. The power path switch 604 comprises a pair of power transistors 706, 708. The power transistors can include, but are not limited to, an P-channel power Metal-Oxide-Semiconductor FETs (MOSFETs). Each MOSFET 706, 708 has three terminals defined as a source $S_{706}$, $S_{708}$, a gate $G_{706}$, $G_{708}$, and a drain $D_{706}$, $D_{708}$. An electrical path can be selectively provided from the source to the drain of the MOSFET. This path is generally referred to herein as the source-drain path. The source-drain path of the MOSFET is connected in series between a voltage source (e.g., the solar panel 400 of FIG. 4) and a load (e.g., the battery 410 of FIG. 4).

A gate drive circuit is provided by the switching controller 612 as discussed above. The switching controller 612 is generally configured to cause a voltage signal to be supplied to the gate of each MOSFET at certain times for switching the transistor from its off-state/closed-state/nonconducting-state to its on-state/open-state/conducting-state. In this regard, the switching controller 612 comprises a control circuit for each MOSFET. The control circuit includes, but is not limited to, a transistor. The voltage of the gate determines the electrical conductivity of the MOSFET.

For example, a voltage signal supplied to the gate of the MOSFET can increase the conductivity of the MOSFET from the off-state/open-state/nonconducting state. As such, the voltage signal 802 is supplied to the gate $G_{706}$ of the transistor 706 and a voltage signal 804 is supplied to the gate $G_{708}$ of the transistor 708, when a reverse polarity connection does not exist on the battery side and a high temperature condition does not exist in a surrounding environment. In effect, the transistors begin conducting such that current flows freely between the drains $D_{706}$, $D_{708}$ and sources $S_{706}$, $S_{708}$.

The switching controller 612 is also configured to stop causing the voltage signal from being supplied to the gate of the transistors at certain times for switching the transistor to its off-state/nonconducting-state. For example, the supply of voltage signals 802, 804 to the gates of the transistor 706, 708 is discontinued when a high temperature condition exists in a surrounding environment and/or the battery is fully charged.

As shown in FIG. 8, the transistors are arranged so that their sources 5706, 5708 are connected directly to each other. The drain-to-drain configuration allows a path to be completely disconnected using the transistors 706, 708 as switches. The importance of the drain-to-drain configuration pertains to a body diode configuration of the transistors 706, 708. MOSFET transistors inherently include a body diode that will allow current to flow in one direction between the source and drain regardless of whether the MOSFET transistor is in an on or off state. Consequently, if only a single MOSFET transistor was used in power path switch in the current path between the solar panel and the battery, it would have the undesirable effect of permitting a back-feed current to flow from the battery to the solar panel under certain conditions, regardless of whether the power path switch was in its on state or off state. To avoid this problem, a back-feed blocking diode could be placed in the current path of the power path switch, between the solar panel and the battery. However, such a back-feed blocking diode will necessarily result in an inefficiency since it will have an inherent voltage drop, and thereby reduce the output voltage of the solar controller. This potential inefficiency and power loss are overcome with the drain to drain MOSFET configuration shown in FIG. 8. In particular, since the body diodes 802, 804 of the transistors 706, 708 are connected anode to anode, a leakage path is eliminated for current or voltage when both transistors 706, 708 are in the off-state/open-state/non-conducting state. If a single transistor or both transistors were oriented in the same direction, then there would be a leakage path for both voltage and current flowing through the body diodes 802, 804 of the transistors 706, 708.

The drain-to-drain configuration shown in FIG. 8 can be used for a wide range of power distributions with no voltage drop, while still providing isolation by eliminating any leakage path and power dissipation. The drain-to-drain configuration allows high current without the voltage drop and loss associated with a blocking diode. Voltage drop across the blocking diode at higher currents degrades power efficiency, impacting regulatory testing, and temperature testing. The present solution is not limited to the transistor pair arrangement of FIG. 8. For example, an electro-mechanical relay can be used instead of the transistor pair arrangement. However, the electro-mechanical relay has a relatively slow response time and a limited life span.

Figure 9:
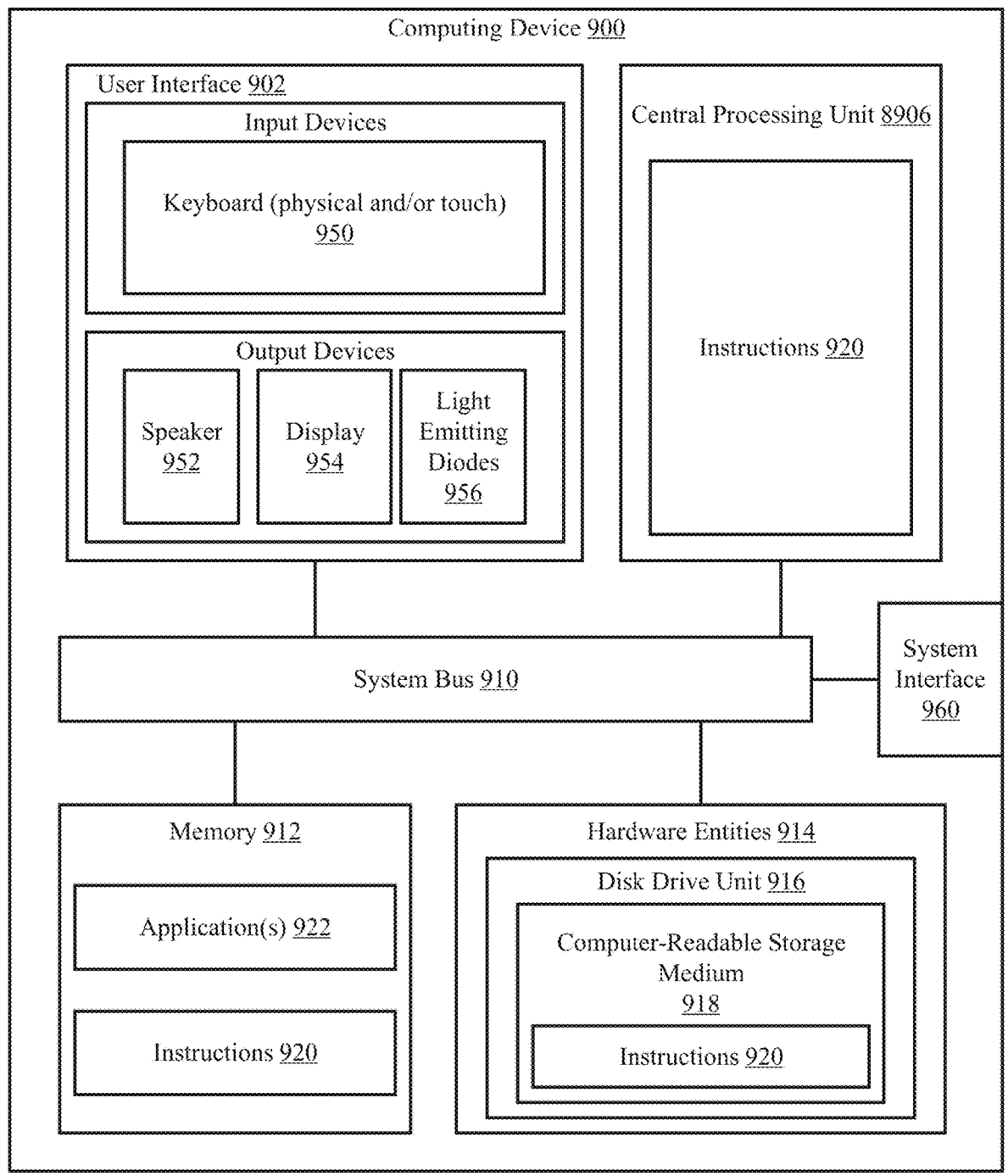
FIG. 9 provides an illustration of an illustrative architecture for a controller of the solar charger system.

Referring now to FIG. 9, there is provided an illustration of an illustrative architecture for a computing device 900. The control circuit 514 of FIG. 5 and/or the computing device 620 of FIG. 6 is at least partially the same as or similar to computing device 900. As such, the discussion of computing device 900 is sufficient for understanding the control circuit 514 of FIG. 4 and/or the computing device 620 of FIG. 6.

Computing device 900 may include more or less components than those shown in FIG. 9. However, the components shown are sufficient to disclose an illustrative solution implementing the present solution. The hardware architecture of FIG. 9 represents one implementation of a representative computing device configured to operate a solar controller, as described herein. As such, the computing device 900 of FIG. 9 implements at least a portion of the method(s) described herein.

Some or all components of the computing device 900 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 9, the computing device 900 comprises a user interface 902, a Central Processing Unit ("CPU") 906, a system bus 910, a memory 912 connected to and accessible by other portions of computing device 900 through system bus 910, a system interface 960, and hardware entities 914 connected to system bus 910. The user interface can include input devices and output devices, which facilitate user-software interactions for controlling operations of the computing device 900. The input devices include, but are not limited to, a physical and/or touch keyboard 950. The input devices can be connected to the computing device 900 via a wired or wireless connection (e.g., a Bluetooth® connection). The output devices include, but are not limited to, a speaker 952, a display 954, and/or light emitting diodes 956. System interface 960 is configured to facilitate wired or wireless communications to and from external devices (e.g., network nodes such as access points, etc.).

At least some of the hardware entities 914 perform actions involving access to and use of memory 912, which can be a Random Access Memory ("RAM"), a disk drive, flash memory, a Compact Disc Read Only Memory ("CD-ROM") and/or another hardware device that is capable of storing instructions and data. Hardware entities 914 can include a disk drive unit 916 comprising a computer-readable storage medium 918 on which is stored one or more sets of instructions 920 (e.g., software code) configured to implement one or more of the methodologies, procedures, or functions described herein. The instructions 920 can also reside, completely or at least partially, within the memory 912 and/or within the CPU 906 during execution thereof by the computing device 900. The memory 912 and the CPU 906 also can constitute machine-readable media. The term "machine-readable media", as used here, refers to a single medium or multiple media (e.g., a centralized or distributed database, and/or associated caches and servers) that store the one or more sets of instructions 920. The term "machine-readable media", as used here, also refers to any medium that is capable of storing, encoding or carrying a set of instructions 920 for execution by the computing device 900 and that cause the computing device 900 to perform any one or more of the methodologies of the present disclosure.

Figure 10A:
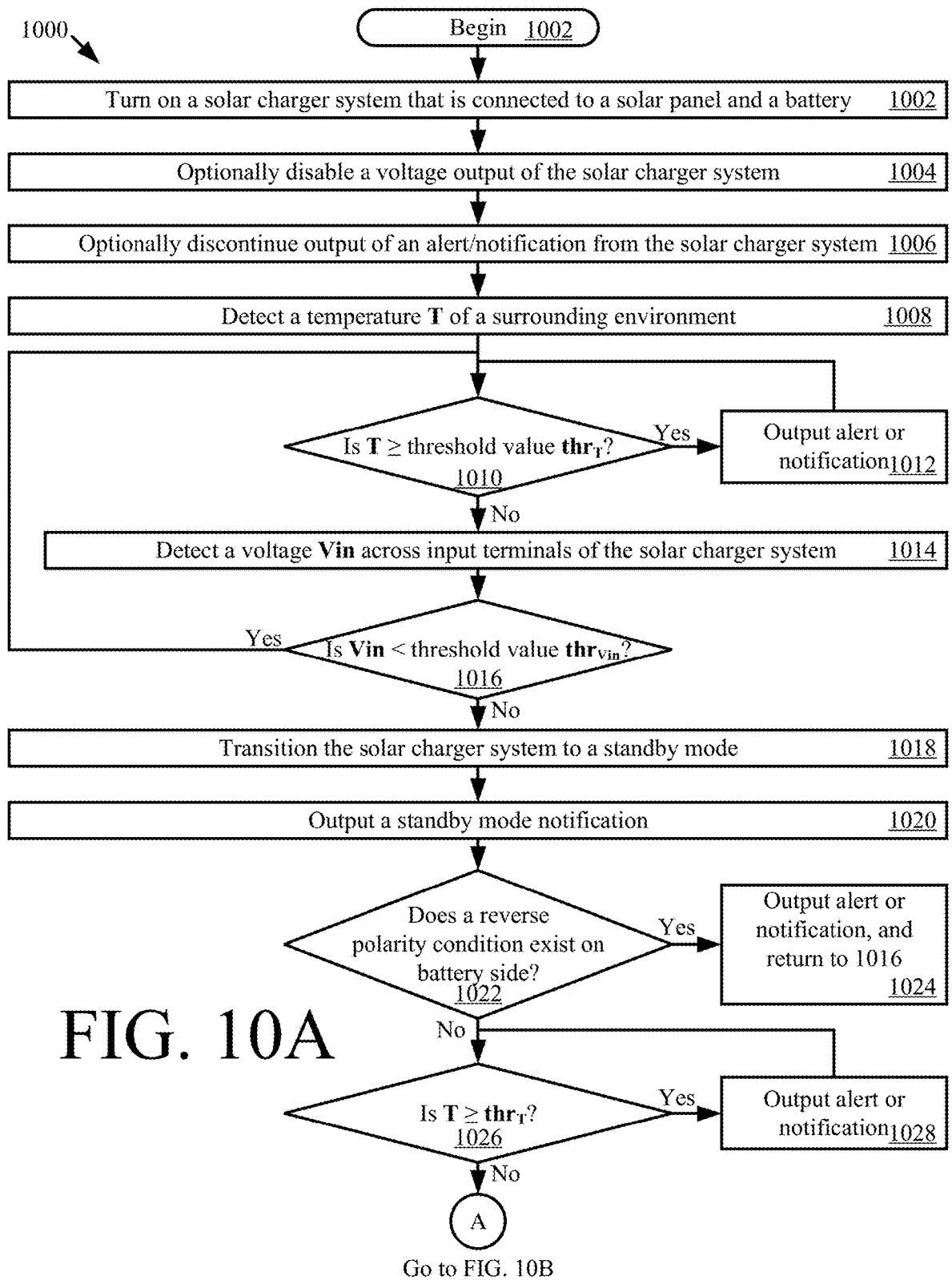
FIGS. 10A-10C (collectively referred to herein as "FIG. 10") provide a flow diagram of an illustrative method for operating a solar charger system.

Referring now to FIG. 10, there is provided a flow diagram of an illustrative method 1000 for operating a solar charger system (e.g., solar charger system 100 of FIGS. 1-8). The solar charger system is connected to a solar panel (e.g., solar panel 400 of FIG. 4) and a battery (e.g., battery 410 of FIG. 4).

Method 1000 begins with 1002 and continues with 1004 where the solar charger system is turned on (e.g., via depression of a physical or virtual button). At this time, the solar charger system is placed in an ON mode of operation. In 1004, a voltage output of the solar charger system is optionally disabled. In 1006, an output of an alert/notification from the solar charger system is optionally discontinued.

Next in 1008, the solar charger system detects a temperature T of a surrounding environment. This detection can be made by a control circuit (e.g., control circuit 514 of FIG. 5, computing device 620 of FIG. 6, and/or computing device 900 of FIG. 9) using sensor data generated by a thermal protection circuit (e.g., thermal protection circuit 512 of FIG. 5), and/or a thermal detector (e.g., thermal detector 618 of FIG. 6) provided within a housing (e.g., hosing 102 of FIG. 1) of the solar charger system. If the temperature T is greater than or equal to a threshold value $thr_T$ [1010:YES], then 1012 is performed where an alert or notification of a high temperature condition is output from the solar charger system. The alert or notification can be provided by a status indicator (e.g., status indicator 622 of FIG. 6) and/or wireless communication device (e.g., wireless communication device 540 of FIG. 5) of the solar charger system. The alert or notification can include a visual alert/notification, a tactile alert/notification, and/or an auditory alert/notification. As such, the status indicator can include, but is not limited to, LED(s), a display, a speaker, and/or a vibration device. The wireless communication device is configured to generate and/or transmit electronic messages (e.g., text message and/or electronic mail messages).

If the temperature T is less than the threshold value $thr_T$ [1010:NO], then 1014 is performed where the solar charger system detects a voltage Vin across its input terminals (e.g., input terminals 602+, 602− of FIG. 6). This detection can be made by the control circuit (e.g., control circuit 514 of FIG. 5, computing device 620 of FIG. 6, and/or computing device 900 of FIG. 9) using sensor data generated by a voltage monitor (e.g., monitor 608 of FIGS. 6-7) provided within the housing of the solar charger system. If the voltage Vin is less than a threshold value $thr_{Vin}$ [1016:YES], then method 1000 returns to 1010.

If the voltage Vin is greater than the threshold value $thr_{Vin}$ [1016:NO], then 1018-1020 are performed. 1018-1020 involve performing operations by the control circuit to: transition the solar charger system to a standby mode of operation; and cause a standby mode notification to be output from the solar charger system. The mode transition can be achieved simply by setting a value of a parameter/flag (e.g., to 0 or 1) in memory (e.g., memory 912 of FIG. 9). The standby notification can be provided by the status indicator and/or wireless communication device of the solar charger system. The standby mode notification can include a visual notification, a tactile notification, and/or an auditory notification.

Next in 1022, the control circuit of the solar charger system determines whether a reverse polarity condition exists on a battery side. This determination can be made based on a signal output from a reverse polarity detection circuit (e.g., reverse polarity detection circuit 508 of FIGS. 5-7, and/or a reverse polarity detector 624 of FIGS. 6-7) provided within the housing of the solar charger system. If a reverse polarity condition exists on the battery side [1022:YES], then 1024 is performed where a reverse polarity alert or notification is output from the solar charger system. This reverse polarity alert/notification can be provided by the status indicator and/or wireless communication device of the solar charger system. The reverse polarity alert/notification can include a visual alert/notification, a tactile alert/notification, and/or an auditory alert/notification.

If a reverse polarity condition does not exist on the battery side [1022:NO], then 1026 is performed where the control circuit of the solar charger system once again determines whether the temperature T is greater than or equal to the threshold value $thr_T$. If the temperature T is greater than or equal to the threshold value $thr_T$ [1026:YES], then 1028 is performed where an alert/notification of the high temperature condition is output from the solar charger system. If the temperature T is less than the threshold value $thr_T$ [1026:NO], then method 1000 continues with 1030 of FIG. 10B.

Figure 10B:
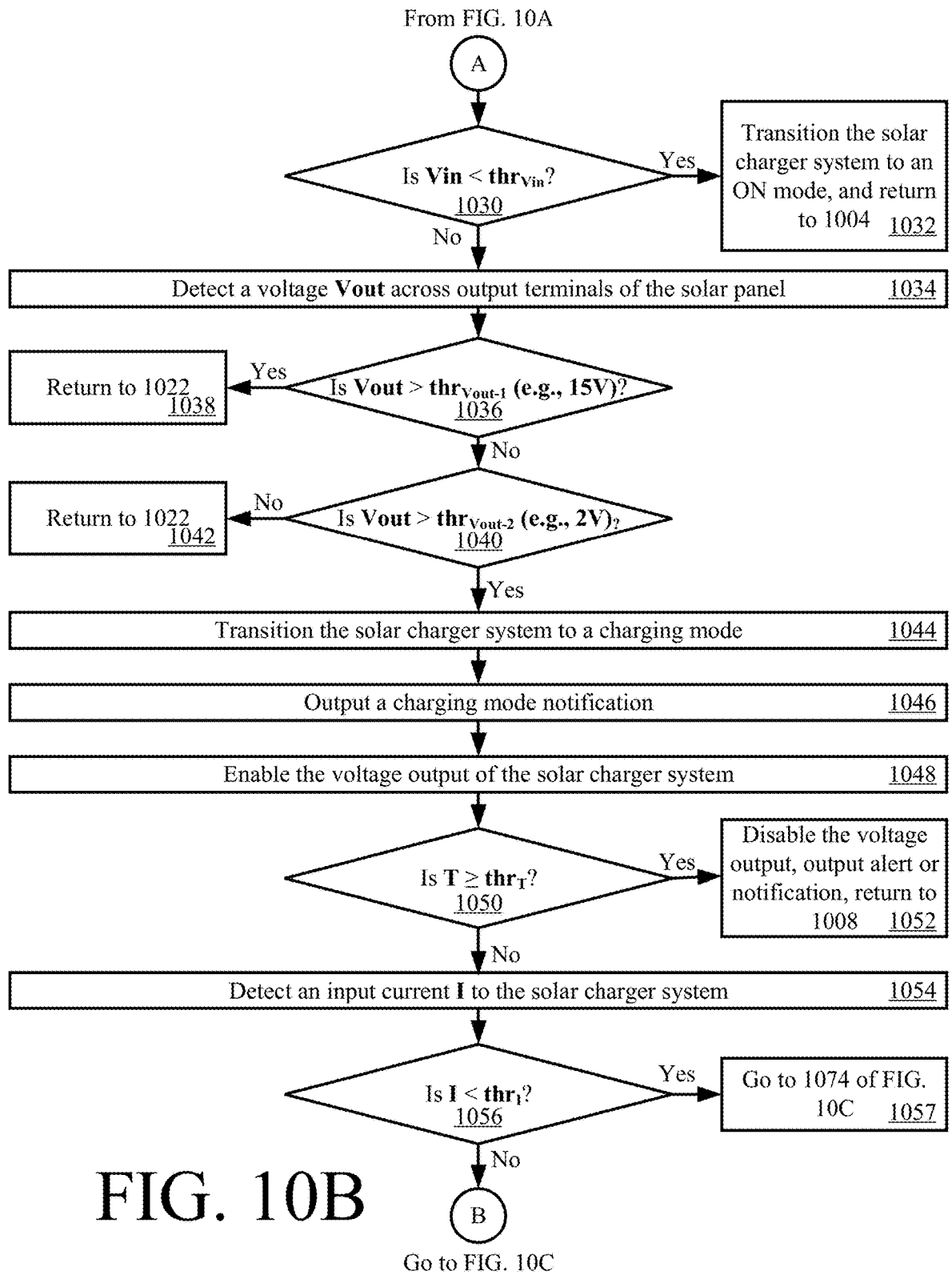

As shown in FIG. 10B, 1030 involves performing operations by the solar charger system to determine if the voltage Vin is less than the threshold value $thr_{Vin}$. If so [1030:YES], then 1032 is performed where the solar charger system is transitioned back to the ON mode. This mode transition can be achieved by setting a value of a parameter or flag in memory (e.g., memory 912 of FIG. 9). Method 1000 then returns to 1004 of FIG. 10A.

If the voltage Vin is greater than the threshold value $thr_{Vin}$, [1030:NO], then 1034 is performed where the solar charger system detects a voltage Vout across its output terminals (e.g., output terminals 606+, 606− of FIG. 7). This detection can be made by the control circuit (e.g., control circuit 514 of FIG. 5, computing device 620 of FIG. 6, and/or computing device 900 of FIG. 9) using sensor data generated by a voltage monitor (e.g., monitor 610 of FIGS. 6-7) provided within the housing of the solar charger system. If the voltage Vout is greater than a threshold value $thr_{Vout-1}$ (e.g., 15 Volts) [1036:YES], then method 1000 returns to 1022 as shown by 1038. The solar charger system compares the voltage Vout to another threshold value $thr_{Vout-2}$ (e.g., 2 Volts) in 1040. If the voltage Vout is less than the threshold value $thr_{Vout-2}$ [1040:NO], then method 1000 returns to 1022 as shown by 1042.

In contrast, if the voltage Vout is greater than the threshold value $thr_{Vout-2}$ [1040:YES], then method 1000 continues with 1044-1048.

1044-1048 involve: transitioning the solar charger system to a charging mode of operation; outputting a charging mode notification from the solar charger system; and enabling the voltage output of the solar charger system. The mode transition can be achieved by setting a value of a parameter or flag in memory (e.g., memory 912 of FIG. 9). The charging mode notification can be provided by the status indicator and/or wireless communication device of the solar charger system. The charging mode notification can include a visual notification, a tactile notification, and/or an auditory notification.

Next in 1050, the solar charger once again compares the temperature T of the surrounding environment to the threshold value $thr_T$. If the temperature T is equal to or greater than the threshold value $thr_T$ [1050:YES], then 1052 is performed where the voltage output of the solar charger system is disabled, a high temperature condition alert/notification is output from the solar charger system, and method 1000 returns to 1008 of FIG. 10A.

If the temperature T is less than the threshold value $thr_T$ [1050:NO], then 1054 is performed where the solar charger system performs operations to detect a current I. This detection can be made by the control circuit (e.g., control circuit 514 of FIG. 5, computing device 620 of FIG. 6, and/or computing device 900 of FIG. 9) using sensor data generated by a current sensor (e.g., current sensor 626 of FIGS. 6-7) provided within the housing of the solar charger system. The current I is compared to a threshold value $thr_I$ (e.g., 50 mA) in 1056. If the current I is less than the threshold value $thr_I$ [1056:YES], then method 1000 continues to 1074 of FIG. 10C, as shown by 1057. 1074 will be described below. If the current I is greater than the threshold value $thr_I$ [1056:NO], then method 1000 continues to 1058 of FIG. 10C.

Figure 10C:
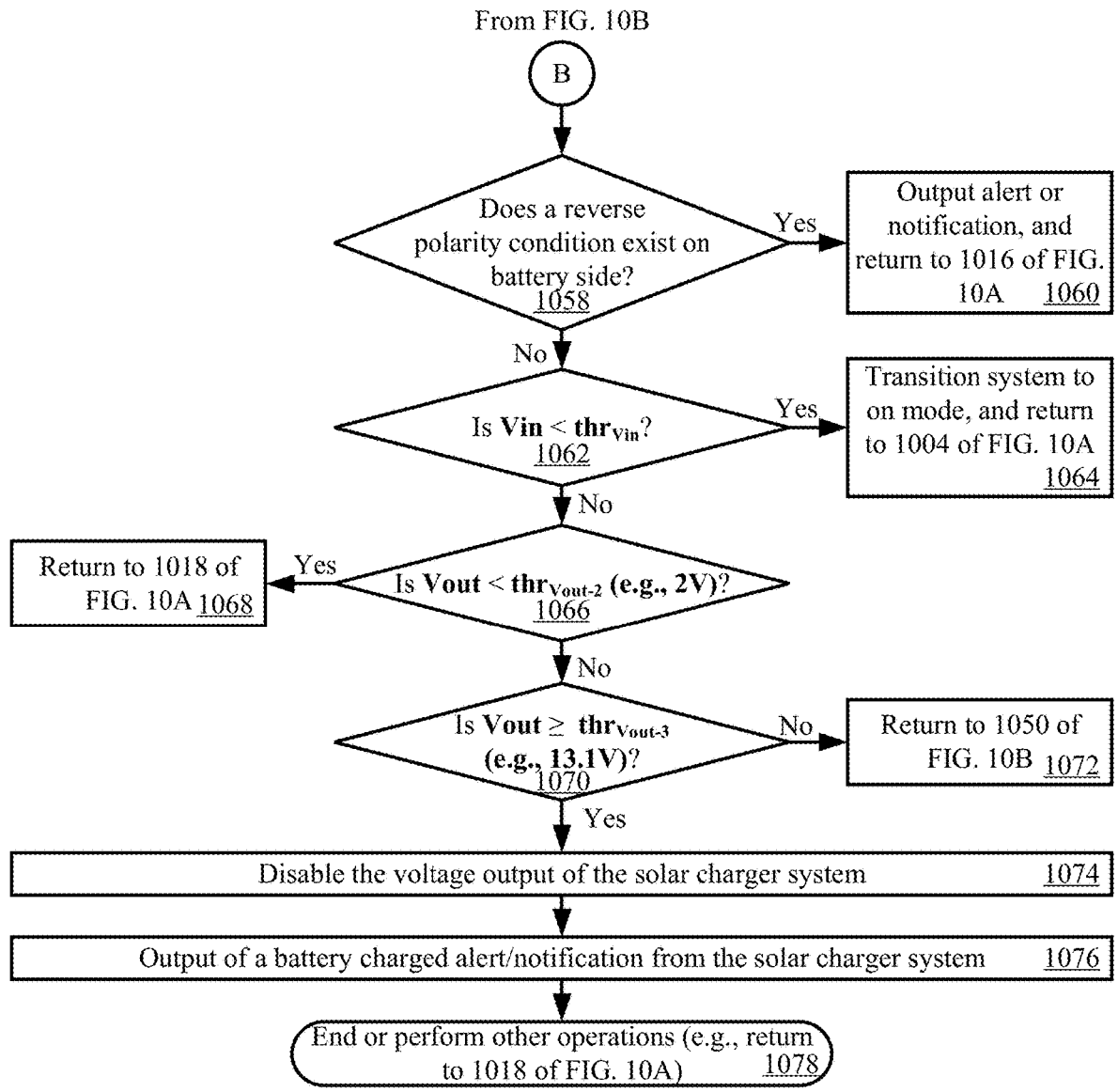

As shown in FIG. 10C, 1058 involves performing operations by the solar charger system to determine if a reverse polarity condition exists on the battery side. If a reverse polarity condition exists [1058:YES], then 1060 is performed where a reverse polarity alert/notification is output from the solar charger system. Thereafter, method 1000 returns to 1016 of FIG. 10A. If a reverse polarity condition does not exist [1058:NO], then 1062 is performed where the solar charger system determines whether voltage Vin is less than the threshold value $thr_{Vin}$. If so [1062:YES], then the solar charger system is transitioned to its ON mode in 1064. Subsequently, method 1000 returns to 1004 of FIG. 10A.

When the voltage Vin is greater than the threshold value $thr_{Vin}$ [1062:NO], the solar charger system compares the voltage Vout to the threshold value $thr_{Vout-2}$ (e.g., 2 Volts). If the voltage Vout is less than the threshold value $thr_{Vout-2}$ [1066:YES], then method 1000 returns to 1018 of FIG. 10A as shown by 1068.

When the voltage Vout is greater than the threshold value $thr_{Vout-2}$ [1066:NO], the solar charger system compares the voltage Vout to another threshold value $thr_{Vout-3}$ (e.g., 13.1 Volts). If the voltage Vout is less than the threshold value $thr_{Vout-3}$ [1070:NO], then method 1000 returns to 1050 of FIG. 10B as shown by 1072. If the voltage Vout is equal to or greater than the threshold value $thr_{Vout-3}$ [1070:YES], then 1074-1076 are performed. 1074-1076 involve: disabling the voltage output of the solar charger system (e.g., via switch(es) 706, 708 of FIG. 7); and outputting a battery charged alert/notification from the solar charger system. Subsequently, 1078 is performed where method 1000 ends or other operations are performed (e.g., return to 1018 of FIG. 10A or transition the solar charger system to an OFF mode of operation).

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for operating a solar charger system, comprising:
providing a first reverse polarity circuit configured to (a) cause enablement of a second reverse polarity circuit when a reverse polarity connection does not exist between a solar panel and the solar charger system and (b) cause disablement of the second reverse polarity circuit when the reverse polarity connection does exist between the solar panel and the solar charger system;
preventing, by the second reverse polarity circuit when enabled, damage to the solar charger system when a reverse polarity connection exists between a battery and the solar charger system;
preventing, by a thermal protection circuit, damage to the battery when a temperature of a surrounding environment exceeds a pre-defined value while the battery is being charged by the solar charger system; and
preventing, by a back-feed prevention circuit, back-feed from the battery without any voltage drop or loss while the battery is being charged by the solar charger system.

2. The method according to claim 1, wherein the first reverse polarity circuit comprises a diode connected between input terminals of the solar charger system.

3. The method according to claim 1, wherein the second reverse polarity circuit comprises an opto-coupler.

4. The method according to claim 2, wherein the opto-coupler comprises a diode connected between output terminals of the solar charger system, and a transistor having a source-drain path connected in series between a voltage source and ground.

5. The method according to claim 4, wherein the diode allows a voltage signal to be supplied to a gate of the transistor when a reverse polarity connection exists on the battery.

6. The method according to claim 4, wherein diode prevents current from being transferred to the transistor when a proper connection is on the battery.

7. The method according to claim 1, further comprising performing operations by a computing device of the solar charger system to prevent enablement of a voltage output of the solar charger system when the reverse polarity connection exists between the battery and the solar charger system.

8. The method according to claim 1, wherein the thermal protection circuit comprises a resistance temperature detector.

9. The method according to claim 1, wherein the back-feed prevention circuit comprises a first field effect transistor connected in series with a second field effect transistor between an input terminal and an output terminal of the solar charger system.

10. The method according to claim 9, wherein a drain of the first field effect transistor is connected directly to a drain of the second field effect transistor.

11. A solar charger system, comprising:
a first reverse polarity circuit configured to (a) cause enablement of a second reverse polarity circuit when a reverse polarity connection does not exist between a solar panel and the solar charger system and (b) cause disablement of the second reverse polarity circuit when the reverse polarity connection does exist between the solar panel and the solar charger system;
the second reverse polarity circuit configured to, when enabled, prevent damage to the solar charger system when a reverse polarity connection exists between the battery and the solar charger system;
a thermal protection circuit configured to prevent damage to the battery when a temperature of a surrounding environment exceeds a pre-defined value while the battery is being charged by the solar charger system; and
a back-feed prevention circuit configured to prevent back-feed from the battery without any voltage drop or loss while the battery is being charged by the solar charger system.

12. The solar charger system according to claim 11, wherein the first reverse polarity circuit comprises a diode connected between input terminals of the solar charger system.

13. The solar charger system according to claim 11, wherein the second reverse polarity circuit comprises an opto-coupler.

14. The solar charger system according to claim 12, wherein the opto-coupler comprises a diode connected between output terminals of the solar charger system, and a transistor having a source-drain path connected in series between a voltage source and ground.

15. The solar charger system according to claim 14, wherein the diode allows a voltage signal to be supplied to a gate of the transistor when a reverse polarity connection exists on the battery.

16. The solar charger system according to claim 14, wherein diode prevents current from being transferred to the transistor when a proper connection is on the battery.

17. The solar charger system according to claim 11, further comprising a computing device configured to prevent enablement of a voltage output of the solar charger system when the reverse polarity connection exists between the battery and the solar charger system.

18. The solar charger system according to claim 11, wherein the thermal protection circuit comprises a resistance temperature detector.

19. The solar charger system according to claim 11, wherein the back-feed prevention circuit comprises a first field effect transistor connected in series with a second field effect transistor between an input terminal and an output terminal of the solar charger system.

20. The solar charger system according to claim 19, wherein a drain of the first field effect transistor is connected directly to a drain of the second field effect transistor.

* * * * *